(12) United States Patent
Jang

(10) Patent No.: US 8,654,478 B2
(45) Date of Patent: Feb. 18, 2014

(54) ROTATING MEMBER ASSEMBLY WITH HUB PERPENDICULARITY CONTROL AND SPINDLE MOTOR INCLUDING THE SAME

(75) Inventor: Ho Kyung Jang, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 0 days.

(21) Appl. No.: 13/474,892

(22) Filed: May 18, 2012

(65) Prior Publication Data
US 2013/0222945 A1  Aug. 29, 2013

(30) Foreign Application Priority Data

Feb. 27, 2012 (KR) .................. 10-2012-0019508

(51) Int. Cl.
*G11B 17/02* (2006.01)
*H02K 7/08* (2006.01)
*F16C 32/06* (2006.01)

(52) U.S. Cl.
USPC ........ 360/98.07; 360/99.08; 310/90; 384/107

(58) Field of Classification Search
USPC ........ 360/98.07, 99.08; 310/90; 384/100, 107
See application file for complete search history.

(56) References Cited

U.S. PATENT DOCUMENTS

| 2005/0025405 | A1 | 2/2005 | Tamaoka |
| 2010/0242262 | A1* | 9/2010 | Nguyen et al. ............ 29/602.1 |
| 2010/0321823 | A1* | 12/2010 | Oe et al. ...................... 360/110 |
| 2011/0033143 | A1* | 2/2011 | Yamada et al. ............. 384/107 |
| 2011/0051287 | A1* | 3/2011 | Tokunaga .................... 360/133 |
| 2011/0064341 | A1* | 3/2011 | Mizuno et al. .............. 384/114 |

FOREIGN PATENT DOCUMENTS

JP   2006-38211   2/2006

* cited by examiner

*Primary Examiner* — Jefferson Evans

(57) ABSTRACT

There are provided a rotating member assembly and a spindle motor including the same. The rotating member assembly includes: a rotating member including a shaft and a hub fixed to an upper portion of the shaft, wherein perpendicularity of the hub with regard to the shaft at a position spaced apart from the center of rotation of the shaft in an outer diameter direction by an axial length or more for which the shaft is fitted into the sleeve is less than double a distance of a gap of a bearing clearance formed by fitting the shaft into the sleeve.

7 Claims, 4 Drawing Sheets

ROTATING MEMBER ASSEMBLY WITH HUB PERPENDICULARITY CONTROL AND SPINDLE MOTOR INCLUDING THE SAME

CROSS-REFERENCE TO RELATED APPLICATIONS

This application claims the priority of Korean Patent Application No. 10-2012-0019508 filed on Feb. 27, 2012, in the Korean Intellectual Property Office, the disclosure of which is incorporated herein by reference.

BACKGROUND OF THE INVENTION

1. Field of the Invention

The present invention relates to a rotating member assembly and a spindle motor including the same.

2. Description of the Related Art

A hard disk drive (HDD), an information storage device, reads data stored on a disk or writes data to the disk using a read/write head.

A hard disk drive requires a disk driving device capable of driving the disk. In the disk driving device, a small-sized spindle motor is used.

This small-sized spindle motor may use a hydrodynamic bearing assembly. A lubricating fluid is interposed between shaft, a rotating member of the hydrodynamic bearing assembly, and a sleeve, a fixed member thereof, such that the shaft is supported by dynamic fluid pressure generated in the lubricating fluid.

In addition, an upper portion of the shaft has a hub rotating together with the shaft and a recoding disk mounted thereon. In the case in which perpendicularity is outside of a normal range by a significant amount in a process of coupling the shaft and the hub, the hub may contact the fixed member, such that rotational performance of the spindle motor may be deteriorated.

SUMMARY OF THE INVENTION

An aspect of the present invention provides a spindle motor in which a fixed member is not impeded by rotation of a rotating member even when the spindle motor is operating and floating performance of the rotating member is not deteriorated, through consideration of an assembly tolerance in a process of designing and assembling the spindle motor.

According to an aspect of the present invention, there is provided a rotating member assembly including: a rotating member including a shaft and a hub fixed to an upper portion of the shaft, wherein perpendicularity of the hub with regard to the shaft at a position spaced apart from the center of rotation of the shaft in an outer diameter direction by an axial length or more for which the shaft is fitted into the sleeve is less than double a distance of a gap of a bearing clearance formed by fitting the shaft into the sleeve.

The perpendicularity of the hub with regard to the shaft may satisfy the following Conditional Equation a and Conditional Equation b:

$$2*B \geq SL \quad \text{Conditional Equation a}$$

$$TP \leq 2*RG, \quad \text{Conditional Equation b}$$

TP being provided at a position spaced apart from the center of rotation in the outer diameter direction by 2*B or more, where B indicates a position at which the perpendicularity of the hub with regard to the shaft is measured, SL indicates an axial length for which the shaft is fitted into the sleeve, and TP indicates the perpendicularity of the hub with regard to the shaft, which is an axially spaced distance from a virtual line perpendicular to the center of rotation of the shaft to the center line of the hub coupled to the shaft, the virtual line perpendicular to the center of rotation of the shaft and the center line of the hub meeting the center of rotation of the shaft.

According to another aspect of the present invention, there is provided a spindle motor including: the rotating member assembly as described above; and a fixed member including a sleeve having a shaft hole into which the shaft is rotatably fitted while being protruded in an upward axial direction and having a lubricating fluid filled in a bearing clearance formed between the sleeve and the shaft.

The hub may have a main wall part extended in a downward axial direction so that at least a portion of an inner surface of the main wall part corresponds to an outer surface of the sleeve.

The inner surface of the main wall part and the outer surface of the sleeve may have a liquid-vapor interface formed therebetween to seal the lubricating fluid.

The rotating member may further include a thrust plate press-fitted onto the shaft to thereby be disposed on an upper surface of the sleeve, and the fixing member may further include a cap member coupled to the sleeve so as to be disposed over the thrust plate.

The cap member and the thrust plate may have a liquid-vapor interface formed therebetween to seal the lubricating fluid.

According to another aspect of the present invention, there is provided a hard disk drive including: the spindle motor as described above rotating a disk through power applied through a substrate; a magnetic head recording data to the disk and reproducing the data from the disk; and a head driver moving the magnetic head to a predetermined position on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, the detailed description thereof will be omitted.

Figure 1:
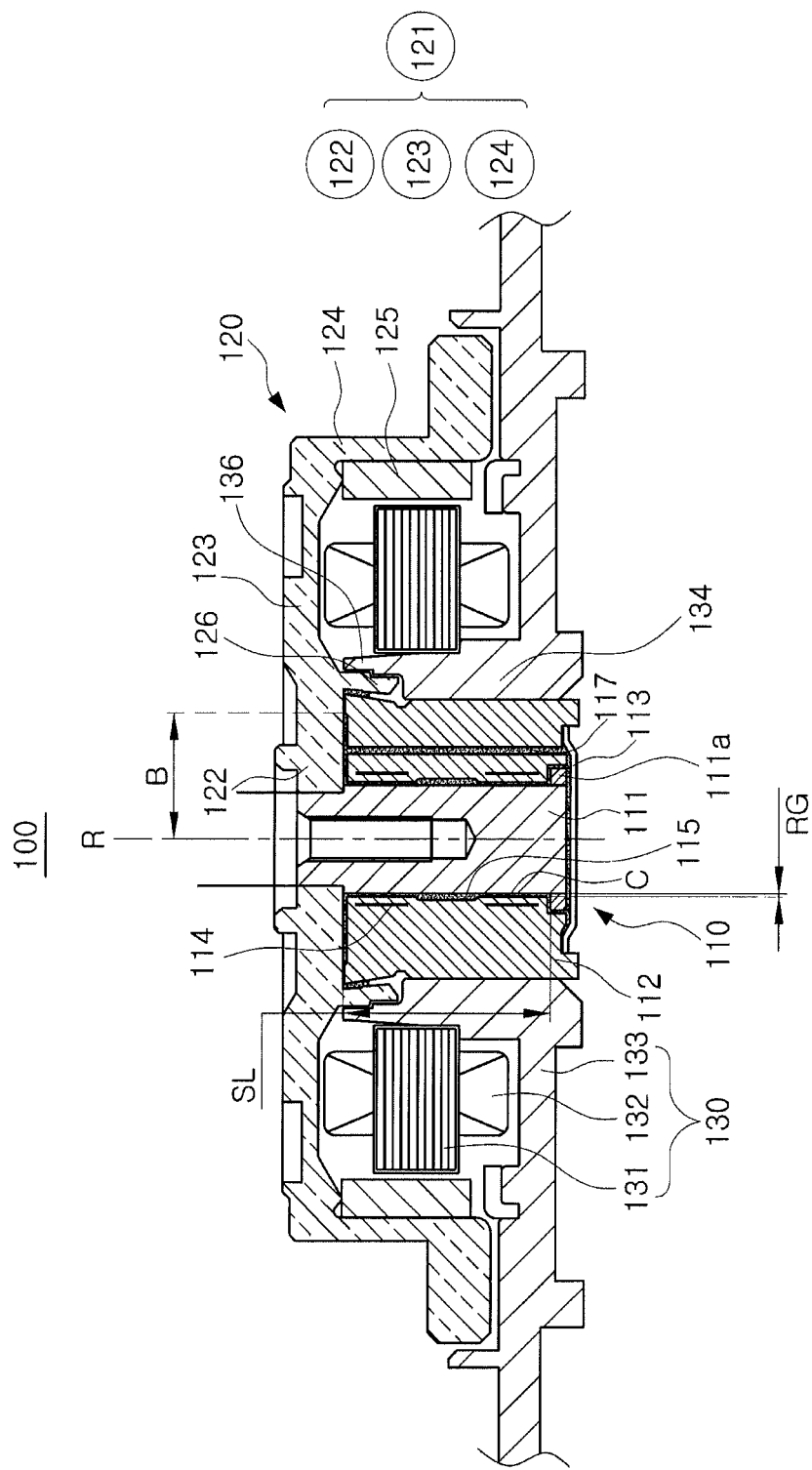
FIG. 1 is a schematic cross-sectional view showing a spindle motor according to an embodiment of the present invention.

FIG. 1 is a schematic cross-sectional view showing a spindle motor according to an embodiment of the present invention.

Referring to FIG. 1, the motor 100 according to the embodiment of the present invention may include a hydrodynamic bearing assembly 110 including a shaft 111 and a sleeve 112, a rotor 120 including a hub 121, and a stator 130 including a core 131 having a coil 132 wound therearound.

The hydrodynamic bearing assembly 110 may include the shaft 111, the sleeve 112, a stopper 111a, and the hub 121, wherein the hub 121 may be a component configuring the hydrodynamic bearing assembly 110 simultaneously with being a component configuring a rotor 120 to be described below.

In addition, a rotating member assembly may include the shaft 111 and the hub 121 mounted on the shaft 111.

Terms with respect to directions will be first defined. As viewed in FIG. 1, an axial direction refers to a vertical direction based on the shaft 111, and an outer diameter or inner diameter direction refers to a direction toward an outer edge of the hub 121 based on the shaft 111 or a direction toward the center of the shaft 111 based on the outer edge of the hub 121.

Further, in the following description, a rotating member may be a rotating member such as the shaft 111, the rotor 120 including the hub 121, the magnet 125 mounted on the rotor 120, and the like, and a fixed member, which is a member other than the rotating member, may be a member fixed, relative to the rotating member, such as the sleeve 112, the stator 130, a base member, or the like.

In addition, a communication path between an interface of a lubricating fluid and the outside indicates a path through which the interface of the lubricating fluid is connected to the outside of the motor, and may have air introduced and discharged therethrough.

The sleeve 112 may support the shaft 111 so that an upper end of the shaft 111 is protruded in an upward axial direction. The sleeve 112 may be formed by sintering a Cu—Fe-based alloy powder or a SUS-based powder. However, the sleeve is not limited thereto, and may be manufactured by various methods.

In this configuration, the shaft 111 may be inserted into a shaft hole of the sleeve 112 to have a micro clearance with the shaft hole of the sleeve 112 to thereby serve as a bearing clearance C. This bearing clearance C may be filled with the lubricating fluid, and rotation of the rotor 120 may be more smoothly supported by upper and lower radial dynamic pressure grooves 114 formed in at least one of an outer circumferential surface of the shaft 111 and an inner circumferential surface of the sleeve 112.

The radial dynamic pressure grooves 114 may be formed in an inner surface of the sleeve 112, which is an inner portion of the shaft hole of the sleeve 112, and generate pressure so that the shaft 111 may smoothly rotate in a state in which the shaft 111 is separated apart from the sleeve 112 by a predetermined interval at the time of rotation thereof.

However, the radial dynamic pressure groove 114 is not limited to being formed in the inner surface of the sleeve 112 as described above but may also be formed in an outer circumferential portion of the shaft 111. In addition, the number of radial dynamic pressure grooves 114 is not limited.

Here, the radial dynamic pressure groove 114 may have at least one of a herringbone shape, a spiral shape, and a helical shape. However, the radial dynamic pressure groove 114 may have any shape as long as radial dynamic pressure may be generated thereby.

The sleeve 112 may include a circulation hole 117 formed therein so as to communicate between upper and lower portions thereof to disperse pressure in the lubricating fluid in an inner portion of the hydrodynamic bearing assembly 110, thereby maintaining balance in the pressure, and may move air bubbles, or the like, present in the inner portion of the hydrodynamic bearing assembly 110 so as to be discharged by circulation.

Here, a lower end of the sleeve 112 may be provided with the stopper 111a protruded from a lower end portion of the shaft 111 in the outer diameter direction. This stopper 111a may be caught by a lower end surface of the sleeve 112 to limit floating of the shaft 111 and the rotor 120.

The spindle motor 100 according to the embodiment of the present invention uses a fluid bearing. Generally, the spindle motor may include a pair of upper and lower radial dynamic pressure grooves 114 for rotational stability to allow two fluid bearings to be formed. However, in the case of the motor using the hydrodynamic bearing, since the rotating member needs to rotate in a state in which it is floated at a predetermined height to thus not contact a bottom plate (a base member 113 in the present embodiment), the fluid may be continuously pumped in a downward axial direction.

Meanwhile, a groove shaped reservoir part 115 may be formed in at least one of the sleeve 112 and the shaft 111 between the upper and lower radial dynamic pressure grooves 114 so that the bearing clearance between the sleeve 112 and the shaft 111 is wider as compared to other portions. Although FIG. 1 shows that the reservoir part 115 is formed in an inner peripheral surface of the sleeve 112 in a circumferential direction, the present invention is not limited thereto. That is, the reservoir part 115 may be formed in the outer peripheral surface of the shaft 111 in the circumferential direction.

Meanwhile, the sleeve 112 may include a base cover 113 coupled thereto at a lower portion thereof in the axial direction, having a clearance therebetween, wherein the clearance receives the lubricating fluid therein.

The base cover 113 may receive the lubricating fluid in the clearance between the base cover 113 and the sleeve 112 to thereby serve as a bearing supporting a lower surface of the shaft 111.

The hub 121, which is a rotating member coupled to the shaft 111 and rotating together with the shaft 111, may configure the rotor 120 simultaneously with configuring the hydrodynamic bearing assembly 110. Hereinafter, the rotor 120 will be described in detail.

The rotor 120 is a rotating structure provided to be rotatable with respect to the stator 130 and may include the hub 121 having an annular ring-shaped magnet 125 provided on an outer peripheral surface thereof, wherein the annular ring-shaped magnet 125 corresponds to a core 131 to be described below, having a predetermined interval therebetween.

In other words, the hub 121 may be a rotating member coupled to the shaft 111 to thereby rotate together therewith.

Here, as the magnet 125, a permanent magnet generating magnetic force having predetermined strength by alternately magnetizing an N pole and an S pole thereof in a circumferential direction may be used.

In addition, the hub 121 may include a first cylindrical wall part 122 fixed to an upper end of the shaft 111, a disk part 123 extended from an end portion of the first cylindrical wall part 122 in the outer diameter direction, and a second cylindrical wall part 124 protruded downwardly from an end portion of the disk part 123 in the outer diameter direction, wherein the second cylindrical wall part 124 may include the magnet 125 coupled to an inner peripheral surface thereof.

The hub 121 may have a main wall part 126 extended in the downward axial direction so as to correspond to an outer portion of the upper portion of the sleeve 112. More specifically, the hub 121 may include the main wall part 126 extended from the disk part 123 in the downward axial direction. A liquid-vapor interface sealing the lubricating fluid may be formed between the outer potion of the sleeve 112 and an inner portion of the main wall part 126.

In addition, an inner surface of the main wall part 126 may be tapered, such that an interval between the inner surface of the main wall part 126 and an outer surface of the sleeve 112 is widened in the downward axial direction to thereby facilitate the sealing of the lubricating fluid. Further, the outer surface of the sleeve 112 may also be tapered to thereby facilitate the sealing of the lubricating fluid.

In addition, the outer surface of the main wall part 126 may be formed to correspond to an inner surface 136 of at least a portion of amounting part 134 protruded upwardly from the base member 133 and may be stepped or tapered so that an interval between the main wall part 126 and the mounting part 134 is widened in the downward axial direction. A detailed description thereof will be provided after a description of a stator 130.

The stator 130 may include a coil 132, a core 131, and a base member 133.

In other words, the stator 130 may be a fixed structure that includes the coil 132 generating electromagnetic force having a predetermined magnitude at the time of the application of power and a plurality of cores 131 having the coil 132 wound therearound.

The core 131 may be fixedly disposed on an upper portion of the base member 133 including a printed circuit board (not shown) having circuit patterns printed thereon, the upper surface of the base member 133 corresponding to the winding coil 132 may be formed with a plurality of coil holes having a predetermined size and penetrating the base member 133 so as to expose the winding coil 132 downwardly, and the winding coil 132 may be electrically connected to the printed circuit board (not shown) so that external power may be supplied thereto.

The outer peripheral surface of the sleeve 112 may be fixed to the base member 133, and the core 131 having the coil 132 wound therearound may be inserted into the base member 133. In addition, the base member 133 and the sleeve 112 may be coupled to each other by applying an adhesive to an inner surface of the base member 133 or an outer surface of the sleeve 112.

In addition, the base member 133 may include the mounting part 134 protruded in the upward axial direction. Therefore, the core 131 may be mounted on an outer surface of the base member 133, the above-mentioned sleeve 112 may be fitted into and fixed to a portion of the inner surface thereof, and the outer surface of the main wall part 126 may be formed to correspond to another portion 136 of the inner surface thereof. The mounting part 134 may not be formed to be high, so as to correspond to the outer surface of the main wall part 126.

Figure 3A:
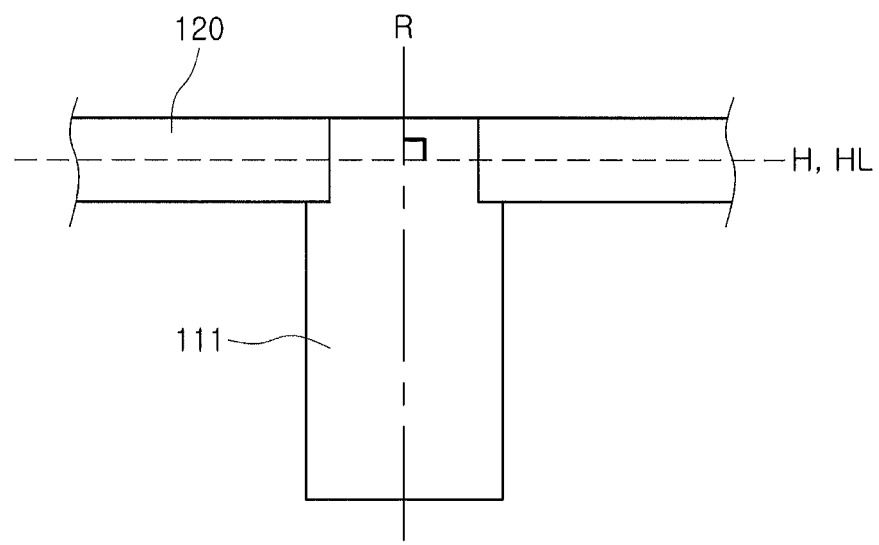
FIGS. 3A and 3B are reference views describing a coupling relationship between a shaft and a hub to which the embodiment of the present invention may be applied.
Figure 3B:
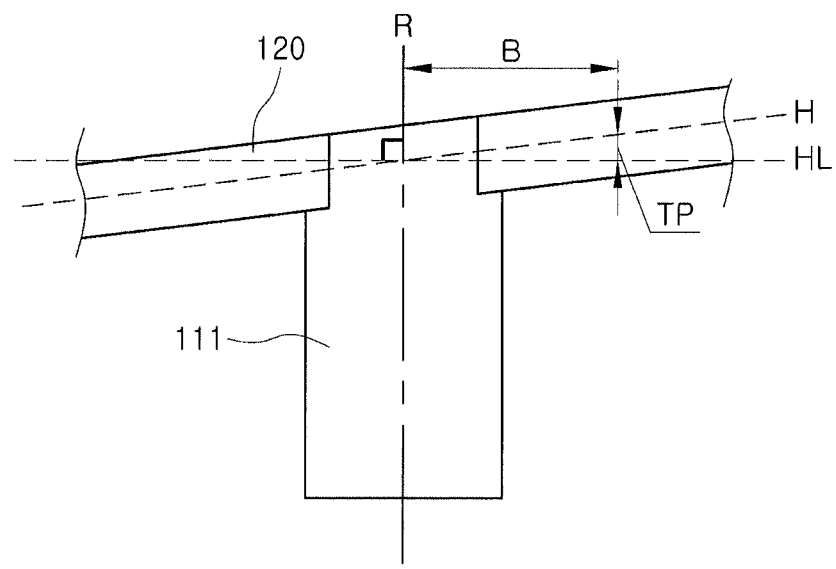
Figure 4:
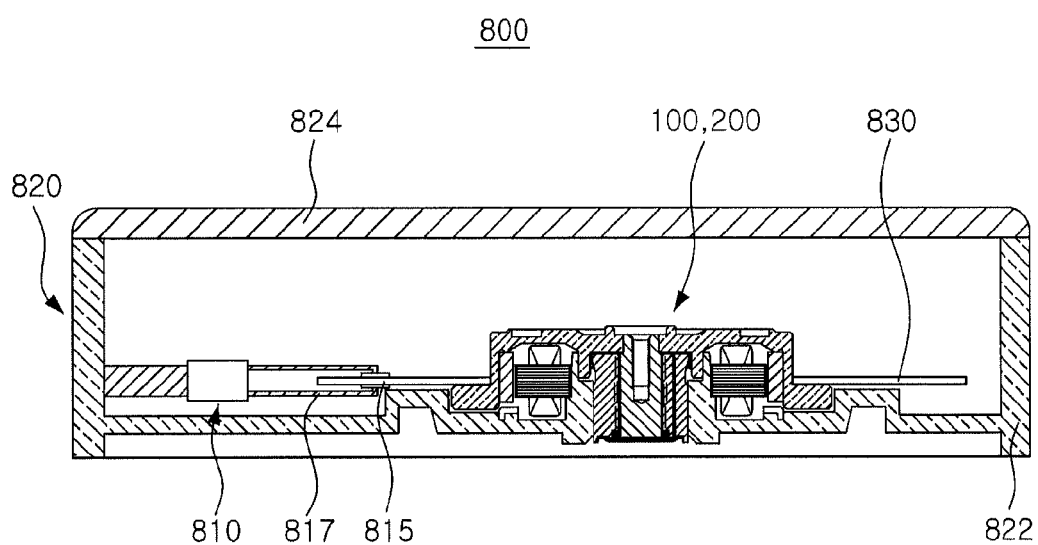
FIG. 4 is a schematic cross-sectional view of a disk driving device using the spindle motor according to the embodiment of the present invention.

FIGS. 3A and 3B are reference views describing a coupling relationship between a shaft and a hub to which the embodiment of the present invention may be applied. Hereinafter, a coupling relationship between members according to the embodiment of the present invention will be described with reference to FIGS. 1, 3A and 3B.

Meanwhile, in the spindle motor according to the embodiment of the present invention, the coupling relationship between the members is defined so that in the case in which a rotating member rotates, the rotating member may rotate easily without contacting a fixed member.

That is, in the case in which the hub 120 is coupled to the shaft 111, it may be ideal that the hub 120 is coupled to the shaft 111 so that the center line R (the center of rotation) of the shaft 111 meets the center line H of the hub 120 perpendicularly.

However, since the shaft 111 and the hub 120 are separate members, an assembly tolerance may be generated in a process of coupling the shaft 111 and the hub 120 to each other. Therefore, it is very important to manage assembly tolerance and permit assembly tolerance after the coupling of the shaft 111 and the hub 120 to some extend.

That is, as shown in FIG. 3A, it is ideal that the shaft 111 and the hub 120 be coupled to each other so that the center line H of the hub 120 coincides with a virtual line HL perpendicular to the center line R (the center of rotation) of the shaft 111 (here, a point simultaneously meeting the center line R of the shaft 111 and the center line H of the hub 120 needs to be formed in the virtual line HL).

However, in general, the assembly tolerance is generated in the process of coupling the shaft 111 and the hub 120 to each other. Therefore, as shown in FIG. 3B, the center line H of the hub 120 does not coincide with the virtual line HL perpendicular to the center line R (the center of rotation) of the shaft 111, such that the center line H of the hub 120 and the virtual line HL deviate from each other.

In this case, a coupling perpendicularity TP error in which a position of the hub 120 deviates in the axial direction of the shaft 111 at a position B provided to be spaced apart from the center of rotation R of the shaft by a predetermined distance in the outer diameter direction, may be generated.

Therefore, according to the embodiment of the present invention, a coupling perpendicularity TP of the hub 120 coupled to the shaft 111 at the position B spaced apart from the center of rotation R of the shaft 111 in the outer diameter direction by an axial length SL at which the shaft 111 is fitted into the sleeve 112 may be less than double a distance of a gap RG of a bearing clearance formed by fitting the shaft 111 into the sleeve 112.

Numerically describing this, the following Conditional Equation a and Conditional Equation b may be satisfied:

$$2*B \geq SL \qquad \text{Conditional Equation a}$$

$$TP \leq 2*RG, \qquad \text{Conditional Equation b}$$

TP being provided at a position spaced apart from the center of rotation in the outer diameter direction by 2*B or more, where B indicates a position at which the perpendicularity of the hub with regard to the shaft is measured, SL indicates an axial length for which the shaft is fitted into the sleeve, and TP indicates the perpendicularity of the hub with regard to the shaft, that is, an axially spaced distance from a virtual line perpendicular to the center of rotation of the shaft to the center line of the hub coupled to the shaft, and the virtual line perpendicular to the center of rotation of the shaft and the center line of the hub meet the center of rotation of the shaft.

When the rotating members (the shaft and the hub) are coupled to each other so as to satisfy these conditions and the assembly tolerance is adjusted in a predetermined range, rotation performance of the rotating member may be improved, whereby performance of the spindle motor may be improved.

Figure 2:
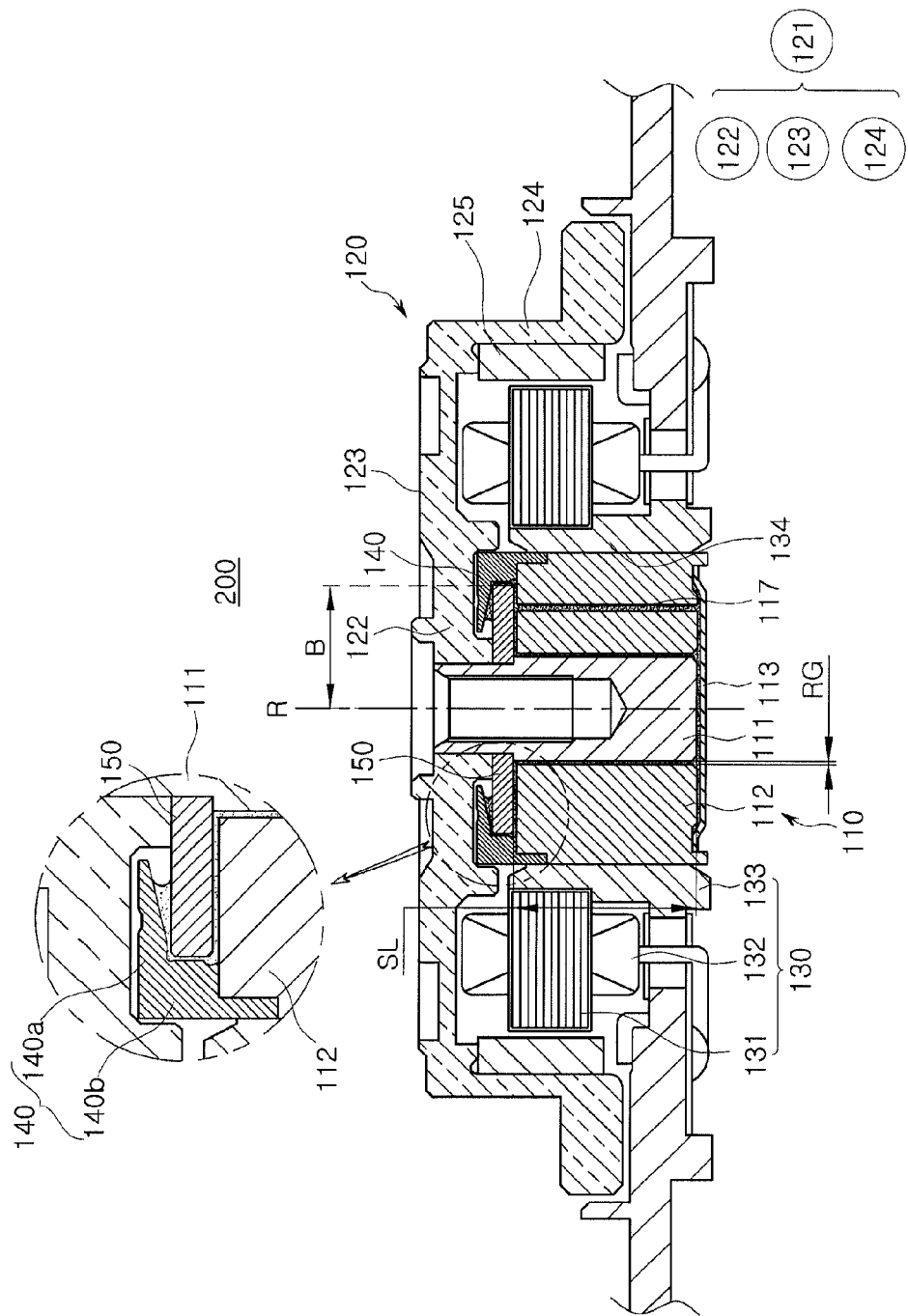
FIG. 2 is a schematic cross-sectional view showing a spindle motor according to another embodiment of the present invention.

FIG. 2 is a schematic cross-sectional view showing a spindle motor according to another embodiment of the present invention.

Referring to FIG. 2, the spindle motor 200 including a hydrodynamic bearing assembly 110 according to another embodiment of the present invention may include the hydrodynamic bearing assembly 110 including a thrust plate 150 and a cap member 140, a stator 130 including a core 131 having a coil 132 wound therearound, and a rotor 120 including a hub 121.

The hydrodynamic bearing assembly 110 according to another embodiment of the present invention is different from the hydrodynamic bearing assembly according to the embodiment of the present invention only in terms of shapes of a cap member and a sleeve and in that it includes a thrust plate 150 serving as a stopper instead of the stopper 111a, and has substantially the same components as those of the hydrodynamic bearing assembly according to the embodiment of the present invention. Therefore, a detailed description of the same components will be omitted in order to prevent confusion and make a description of the present invention clear. Hereinafter, a content different from the content described above in the embodiment of the present invention will mainly be described.

A sleeve 112 may support a shaft 111 so that an upper end of the shaft 111 is protruded upwardly in the axial direction and may be formed by forging Cu or Al or sintering Cu—Fe based alloy powders or SUS based powders. The sleeve may also be formed by other methods.

Here, the shaft 111 may be inserted into a shaft hole of the sleeve 112 so as to have a micro clearance therebetween. The micro clearance may be filled with a lubricating fluid, and the rotation of the rotor 120 may be more smoothly supported by radial dynamic pressure grooves formed in at least one of an outer circumferential surface of the shaft 111 and an inner circumferential surface of the sleeve 112.

The radial dynamic pressure grooves may be formed in an inner surface of the sleeve 112, which is an inner portion of the shaft hole of the sleeve 112, and generate pressure so that the shaft 111 rotates in a state in which the shaft 111 is spaced apart from the inner surface of the sleeve 112 by a predetermined interval at the time of rotation thereof.

However, the radial dynamic pressure grooves are not limited to being formed in the inner surface of the sleeve 112 as described above, but may also be formed in an outer circumferential portion of the shaft 111. In addition, the number of radial dynamic pressure grooves is not limited.

The sleeve 112 may include a circulation hole 117 formed therein so as to communicate between upper and lower portions thereof to disperse pressure of the lubricating fluid in an inner portion of the hydrodynamic bearing assembly 110, thereby maintaining pressure balance, and may move air bubbles, or the like, present in the inner portion of the hydrodynamic bearing assembly 110 so as to be discharged by circulation.

Here, the sleeve 112 may include a cover plate 113 coupled thereto at a lower portion thereof, having a clearance therebetween, wherein the clearance receives the lubricating fluid therein.

The cover plate 113 may receive the lubricating fluid in the clearance between the cover plate 113 and the sleeve 112 to thereby serve as a bearing supporting a lower surface of the shaft 111.

The thrust plate 150 may be disposed on the shaft 111 and be mounted on an upper surface of the sleeve 112 to form a liquid-vapor interface between the thrust plate 150 and a cap member 140 to be described below, thereby sealing the lubricating fluid.

Furthermore, a thrust dynamic pressure groove generating thrust dynamic pressure may be formed in at least one of a lower surface of the thrust plate 150 and an upper surface of the sleeve 112 facing the lower surface of the thrust plate 150. The thrust dynamic pressure groove may have at least one of a herringbone shape, a spiral shape, and a helical shape.

The cap member 140 may be a member mounted on the sleeve 120 so as to be positioned over the thrust plate 150 to thereby seal the lubricating fluid between the cap member 140 and the thrust plate 150.

The cap member 140 may include a horizontal part 140a disposed over the thrust plate and a vertical part 140b extended downwardly from an outer edge of the horizontal part 140a. That is, an inner peripheral surface of the vertical part 140b may be press-fitted into an outer peripheral surface of the sleeve 112 or be bonded to the outer peripheral surface of the sleeve 112 by an adhesive.

As set forth above, in the case of the spindle motor according to the embodiment of the present invention, an assembly tolerance is considered in a process of designing and assembling the spindle motor, whereby a fixed member may not be impeded by rotation of a rotating member when the spindle motor is operating and floating performance of the rotating member may not be deteriorated.

While the present invention has been shown and described in connection with the embodiments, it will be apparent to those skilled in the art that modifications and variations can be made without departing from the spirit and scope of the invention as defined by the appended claims.

What is claimed is:

1. A rotating member assembly comprising:
a rotating member including a shaft and a hub fixed to an upper portion of the shaft, wherein
perpendicularity of the hub with regard to the shaft satisfies the following Conditional Equation a and Conditional Equation b:

$$2*B \geq SL \qquad \text{Conditional Equation a}$$

$$TP \leq 2*RG, \qquad \text{Conditional Equation b}$$

TP being provided at a position spaced apart from a center of rotation of the shaft in an outer diameter direction by 2*B or more,
where B indicates a position at which the perpendicularity of the hub with regard to the shaft is measured, SL indicates an axial length for which the shaft is fitted into the sleeve when a motor is at rest, and TP indicates the perpendicularity of the hub with regard to the shaft when the motor is at rest, an axially spaced distance from a virtual line perpendicular to the center of rotation of the shaft to a center line of the hub coupled to the shaft, the virtual line perpendicular to the center of rotation of the shaft and the center line of the hub meeting the center of rotation of the shaft.

2. A spindle motor comprising:
the rotating member assembly of claim 1; and
a fixed member including the sleeve having a shaft hole so as to allow the shaft to be rotatably fitted thereinto while being protruded in an upward axial direction and having a lubricating fluid filled in a bearing clearance formed between the sleeve and the shaft.

3. The spindle motor of claim 2, wherein the hub has a main wall part extended in a downward axial direction so that at least a portion of an inner surface of the main wall part corresponds to an outer surface of the sleeve.

4. The spindle motor of claim 3, wherein the inner surface of the main wall part and the outer surface of the sleeve have a liquid-vapor interface formed therebetween to seal the lubricating fluid.

5. The spindle motor of claim 2, wherein the rotating member further includes a thrust plate press-fitted onto the shaft to thereby be disposed on an upper surface of the sleeve, and
the fixing member further includes a cap member coupled to the sleeve so as to be disposed over the thrust plate.

6. The spindle motor of claim 5, wherein the cap member and the thrust plate have a liquid-vapor interface formed therebetween to seal the lubricating fluid.

7. A hard disk drive comprising:
the spindle motor of claim 2 rotating a disk through power applied through a substrate;
a magnetic head recording data to the disk and reproducing the data from the disk; and
a head driver moving the magnetic head to a predetermined position on the disk.

* * * * *